(No Model.)　　　　　　　　　　　　　　　　2 Sheets—Sheet 2.
R. P. BOLTON.
ENGINE GOVERNOR.

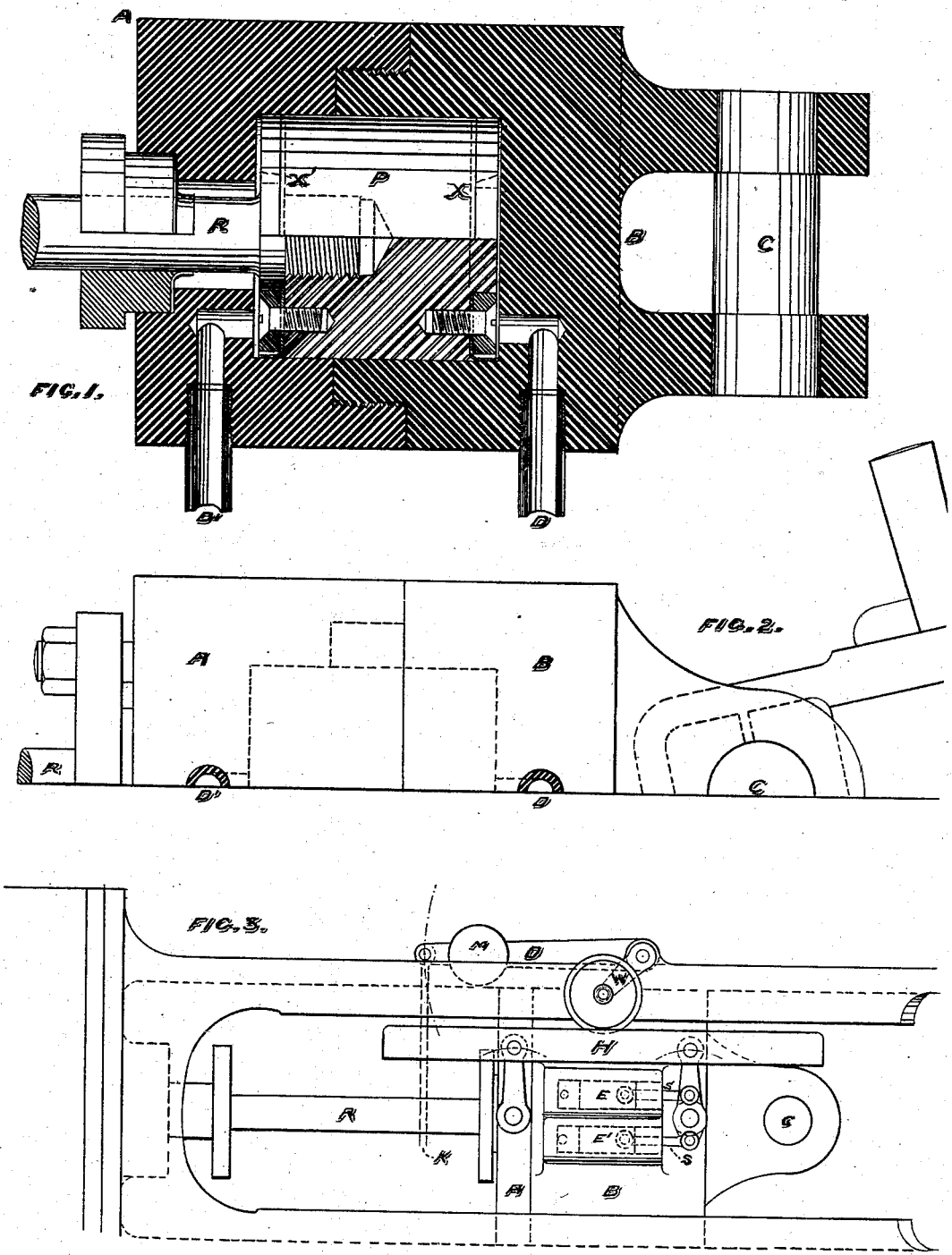

No. 255,760.　　　　　　　　　　　Patented Apr. 4, 1882.

UNITED STATES PATENT OFFICE.

REGINALD P. BOLTON, OF CAMBRIDGEPORT, MASSACHUSETTS.

ENGINE-GOVERNOR.

SPECIFICATION forming part of Letters Patent No. 255,760, dated April 4, 1882.

Application filed September 3, 1881. (No model.)

*To all whom it may concern:*

Be it known that I, REGINALD P. BOLTON, a subject of the Queen of Great Britain, and residing at Cambridgeport, in the county of Middlesex and State of Massachusetts, have invented a new and useful Governor for Engines, of which the following is a specification.

The object of my invention is to provide a governor for steam and other engines that will not require a change in the speed of the engine in order to bring about a change in the amount of steam or other vapor or gas admitted to the cylinder; and it consists in the interposition between the piston and the crank of any engine of a hydraulic cushion which shall receive compression by the transmission of power through it to the crank. This compression is utilized to actuate the cut-off gear or throttle-valve.

Figure 4:
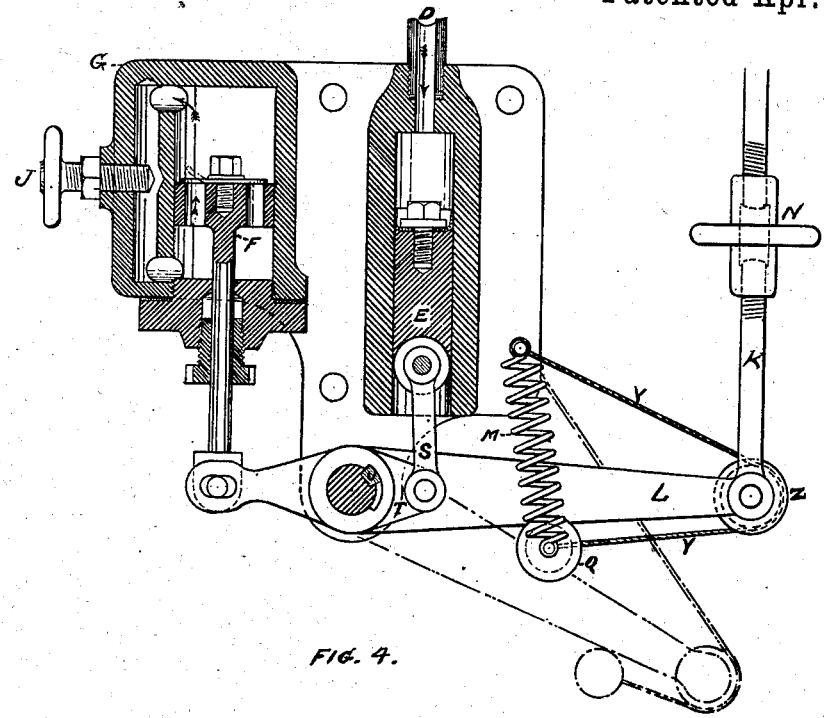
Figure 5:
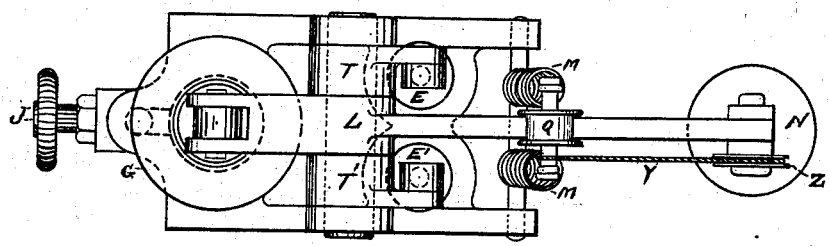

In the accompanying drawings, in which like letters of reference denote like parts, Figure 1 represents a sectional elevation of the cylinder cross-head. Fig. 2 is a half elevation of the same. Fig. 3 shows a method of connecting the cross-head with the cut-off gear. Fig. 4 is a sectional elevation of the rams when used in connection with a dash-pot, and Fig. 5 is a plan of the same.

For purposes of explanation the governor will be placed in the cross-head; but in practice it may be put at any convenient place between the piston and main shaft.

The cross-head or guide-block of the engine is made of such a shape that it can be bored out as a cylinder. In Fig. 1 it is shown in halves A and B, screwed together in the middle, and in Fig. 3 one end, A, is removable. In the cylinder thus formed a plunger, P, Fig. 1, is placed, fitted with hydraulic packing at either end, and of such length as to leave a small clearance-space, X X', at each end, these spaces to be filled with water or hydraulic mixture. The plunger P is screwed to the piston-rod R of the engine, and on the forward end of the cross-head A B are jaws carrying the pin C for the connecting-rod of the engine. Any pressure on the piston is communicated to the plunger P, thence to the water in one of the clearance-spaces, and from it to the cross-head and connecting-rod. As long as there is no resistance to the motion of the crank the compression set up in the water will be only that due to the resistance of driving the connecting-rod, crank, &c. As soon, however, as any load is thrown on the driving-shaft the pressure in the water will be raised proportionately, and should the load be sufficient to stop the engine, the pressure will be equal to that of the steam on the piston of the engine. These various pressures are utilized in the following manner: Through the holes and pipes D and D', Figs. 1, 2, and 4, the water communicates by means of flexible tubes or sliding pipes, or, as in Fig. 3, by drilled holes in the casting, with small rams E and E' respectively, Figs. 3, 4, and 5. It follows that any pressure in the hydraulic cylinder of the cross-head will move one of the rams forward, and their size being small compared with the area of the plunger P, a very slight motion of P will suffice to move the rams E and E' a considerable distance. These rams are connected by links S to cranks T and T', Figs. 4 and 5, on a cross-shaft fitted with a feather, U. On this shaft is a lever, L, one end of which is coupled to the piston F of the dash-pot G, the flow of the liquid in which is controlled by the adjustable valve-screw J. The other end of the lever L takes hold of the rod K, which moves the cut-off gear, and which is adjustable by the right-and-left-hand screw-nut N. The lever L is kept back and the pressure on the rams E and E', regulated by a pair of springs, M and M', arranged on either side of the lever L, and bearing on it by the roller Q.

To the spindle of the roller Q is attached a cord, Y, leading over a wheel, Z, on the pin-connection of L and K, and back to the cylinder-casting. Thus, when the lever L moves, as represented by the dotted lines, the roller is carried along it away from the center of motion, proportionately increasing the load on it, while the inclination of the springs is sufficient to return the roller Q to its original position when the lever L returns.

When the pressure from the steam-piston opposed by the inertia of the engine's load sets up a pressure in the water X' of the hydraulic cylinder, Fig. 1, the ram E', Figs. 4 and 5, is moved forward against the pressure of the springs M and M' and resistance of the dash-pot G, and as the pressure increases during the stroke, so the power of the springs M and M' increases by the means described. At the same time the ram E is retiring proportionately to the forward motion of E'. It is able to do so by reason of the keyway in its crank T being slotted back to give clearance to key U. As soon as the pressure begins to relax by any means—such as the natural cut-off of the main slide-valve or the throwing off of the load or breakage—the springs M and M' bring the lever L back, pulling with it the piston F, which is pierced with holes fitted with rubber valves, thereby permitting a quick return through itself of the liquid. The ram E' is also retired until the pressure caused by the reverse action of the engine is put on E, which then advances, and the lever L is again set forward.

In Fig. 3 the two ram cylinders E and E' are cast or bolted to the side of the hydraulic cross-head A B, and actuate by levers (which are to be held in a vertical position by springs) a parallel bar, H, which is shown in its normal condition, the engine running without load. When either ram moves forward, the other retiring at the same time, the bar H is lowered and the wheel on the bell-crank lever W O follows, moving the rod K on the other side of the engine, to which is coupled the cut-off gear or throttle-valve.

What I claim as my invention, and desire to secure by Letters Patent, is—

1. The interposition between the piston and crank of any steam, air, gas, or water engine of a hydraulic cushion in which the pressures set up by variations in the load are used to actuate the motive supply, substantially in the manner as shown and described.

2. A cross-head or sliding block bored out as a cylinder and used for a governor, substantially in the manner as shown and described.

3. In an engine-governor, the combination of the piston-rod and the plunger P with the cylinder cross-head A B and hydraulic cushion, substantially as shown and described.

4. In an engine-governor, the combination of the rams E and E', the links S, and the cranks T and T', said cranks being free of each other's motion by a slotted keyway, substantially as shown and described.

5. In an engine-governor, the combination of a dash-pot, G, with the rams E and E', substantially as shown and described.

6. In an engine-governor, the combinations of the rams E and E', and the springs M and M', and the roller Q, with the cord Y and wheel Z, for the purpose of proportionately increasing the load on the lever L, substantially as shown and described.

7. In an engine-governor, the combination of the rams E and E' and the cross head A B with the parallel bar H, and the wheel and bell-crank lever W O, whereby the throttle-valve or cut-off gear may be actuated, substantially as shown and described.

REGINALD P. BOLTON.

Witnesses:
DE COURCY MAY,
GEORGE E. WHITNEY.